(12) United States Patent
Kim

(10) Patent No.: US 11,386,200 B2
(45) Date of Patent: Jul. 12, 2022

(54) COMPUTER HAVING ISOLATED USER COMPUTING UNIT

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 292 days.

(21) Appl. No.: 16/611,984

(22) PCT Filed: Apr. 23, 2018

(86) PCT No.: PCT/KR2018/004689
§ 371 (c)(1),
(2) Date: Nov. 8, 2019

(87) PCT Pub. No.: WO2018/208032
PCT Pub. Date: Nov. 15, 2018

(65) Prior Publication Data
US 2021/0141894 A1   May 13, 2021

(30) Foreign Application Priority Data
May 10, 2017 (KR) .......................... 10-2017-0057998

(51) Int. Cl.
*G06F 11/00* (2006.01)
*G06F 12/14* (2006.01)
(Continued)

(52) U.S. Cl.
CPC .............. *G06F 21/54* (2013.01); *G06F 21/53* (2013.01); *G06F 21/554* (2013.01); *G06F 21/566* (2013.01); *G06F 21/85* (2013.01)

(58) Field of Classification Search
CPC ........ G06F 21/54; G06F 21/53; G06F 21/554; G06F 21/566; G06F 21/85; G06F 21/55; G06F 21/70; H04W 12/12; H04L 63/14
See application file for complete search history.

(56) References Cited

U.S. PATENT DOCUMENTS 4,211,927 A * 7/1980 Hellstrom ............ A61B 6/4476
378/26
6,845,464 B2 * 1/2005 Gold ................... G06F 11/1417
711/162
(Continued)

FOREIGN PATENT DOCUMENTS

JP 2003-330902 A 11/2003
JP 2006-068064 A 3/2006
(Continued)

OTHER PUBLICATIONS

International Search Report of PCT/KR2018/004689 dated Aug. 30, 2018.
(Continued)

*Primary Examiner* — Trong H Nguyen
(74) *Attorney, Agent, or Firm* — Sughrue Mion, PLLC

(57) ABSTRACT

The present invention relates to a computer having an isolated user computing unit for responding to a system seizing attempt by a malicious code and minimizing damage to a system. A computer according to a feature proposed by the present invention comprises: a security management computing unit for managing connected I/O devices and auxiliary memory device unit; and a user computing unit which is isolated from the I/O devices, communicates with the I/O devices via an intercommunication unit responsible for communication between the security management computing unit and the user computing unit, has a separate CPU and memory, and is connected to the security management computing unit. The security management computing unit manages the I/O devices, monitors and restores a system, and monitors and controls the user computing unit, and the user computing unit is isolated from the security management computing unit and executes a user program and a user OS.

14 Claims, 3 Drawing Sheets

(51) Int. Cl.
*G06F 12/16* (2006.01)
*G08B 23/00* (2006.01)
*G06F 21/54* (2013.01)
*G06F 21/53* (2013.01)
*G06F 21/55* (2013.01)
*G06F 21/56* (2013.01)
*G06F 21/85* (2013.01)

(56) References Cited

U.S. PATENT DOCUMENTS

| | | | |
|---|---|---|---|
| 6,880,110 | B2 | 4/2005 | Largman et al. |
| 7,082,539 | B1* | 7/2006 | Kitahara ................. G06F 21/71 |
| | | | 713/189 |
| 7,484,247 | B2 | 1/2009 | Rozman et al. |
| 2004/0172578 | A1* | 9/2004 | Chen ................... G06F 11/1417 |
| | | | 714/15 |
| 2005/0091522 | A1* | 4/2005 | Hearn ................... G06F 21/575 |
| | | | 726/26 |
| 2006/0031940 | A1* | 2/2006 | Rozman ................ G06F 21/568 |
| | | | 726/27 |
| 2006/0195907 | A1 | 8/2006 | Delfs et al. |
| 2008/0263371 | A1* | 10/2008 | Weissman ............ G06F 21/575 |
| | | | 713/193 |
| 2016/0371500 | A1* | 12/2016 | Huang .................. G06F 21/604 |
| 2017/0063877 | A1 | 3/2017 | Newman et al. |
| 2018/0225230 | A1* | 8/2018 | Litichever ............... G06F 21/82 |

FOREIGN PATENT DOCUMENTS

| | | |
|---|---|---|
| JP | 2006-318435 A | 11/2006 |
| JP | 2011-022639 A | 2/2011 |
| KR | 10-2001-0000299 A | 1/2001 |
| KR | 10-2004-0022439 A | 3/2004 |
| KR | 10-0774013 B1 | 11/2007 |
| KR | 10-0948386 B1 | 3/2010 |
| KR | 10-2010-0089387 A | 8/2010 |

OTHER PUBLICATIONS

Jian Huang et al., "FlashGuard: Leveraging Intrinsic Flash Properties to Defend Against Encryption Ransomware", ACM SIGSAC Conference on Computerand Communications Security, Oct. 2019, pp. 2231-2244 (14 pages).

* cited by examiner

COMPUTER HAVING ISOLATED USER COMPUTING UNIT

CROSS-REFERENCE TO RELATED APPLICATIONS

This application is a National Phase Application of PCT International Application No. PCT/KR2018/004689, which was filed on Apr. 23, 2018, and which claims priority from Korean Patent Application No. 10-2017-0057998 filed with the Korean Intellectual Property Office on May 10, 2017. The disclosures of the above patent applications are incorporated herein by reference in their entirety.

BACKGROUND

1. Technical Field

The present invention relates to a computer having an isolated user computing unit for responding to a system seizing attempt by malicious code and for minimizing damage to a system.

2. Description of the Related Art

In common, a computer is designed in various structures to prepare for malfunctions in the computer. As such structures incur additional cost, however, they are not applied to general personal computers such as PCs and laptops. A widely used computer device, such as a PC, mobile phone, and laptop, typically has a single CPU. While auxiliary processors having certain capabilities such as GPU, DSP, and ALU may occasionally be used, such a sub-structure does not in itself have an OS, and the system only has a single OS. As a result, if the hardware or software causes a problem, the corresponding system is immediately halted.

In contrast, a large-scale computer used in banking transactions or securities transactions, etc., where a halt in the overall system due to a malfunction would result in a major problem, is used with multiple CPU's, CPU units, or computers connected with one another, and such a system is usually structured to respond to malfunctions such that, even if some part (a unit or computer) incurs a malfunction, the tasks performed at the part experiencing a problem are taken over by another part operating normally under the control of the OS. In this way, such large-scale computer systems are composed to be capable of the high-speed processing of multiple tasks in a distributed manner. Thus, these devices typically have a parallel processing structure for processing multiple tasks required by a multiple number of users or for processing a single task at a high speed.

However, even in this case where a system is controlled by a single OS or multiple OS's, the supervising administrator can control the entire system on the OS. Therefore, if a hacking or a malicious code, such as a computer virus, seizes a system under the guise of a supervising administrator, such attacks to seize the system cannot be restricted. Also, if a worker were to attack the system with malicious intent, it would be impossible to respond to such an attack. That is, these systems have system architecture merely to exclude malfunctioning units or computers and to continue current tasks on normal units or computers, and these systems are unable to prevent a user or malicious code in supervisor mode from attacking the system and placing it in an uncontrollable state.

In the case of airplanes, spacecraft, high-speed trains, automobiles, plant automatic control systems, etc., a multiple number of computer systems may also be adapted to cope with malfunctions. Here, the inputted signals or information are processed simultaneously by multiple computer systems, all of which output results, but only the information from the computer system designated as the main system is ultimately used, and the computer systems designated as redundant systems remain in standby, monitoring the operation of the main system. If a malfunction of the main system is detected during standby, then a reserved computer system automatically replaces the main computer system.

In cases such as a spacecraft where an error in the output causes a major problem, a voting architecture may be applied to multiple computer outputs, to thereby determine the output that is to be used. In such a structure involving multiple or redundant computers, the use of a multiple number of CPU units or computers is intended merely for the purpose of uninterruptedly obtaining computation results even when an individual unit or computer malfunctions.

However, as some of these systems have recently started using general OS's such as Windows CE and Android, there have been occurrences in which a hacking or malicious code such as a computer virus seizes the entire computer. Since these systems are unable to recognize such a problem as a malfunction, it is impossible to prevent malicious code or an administrator having malicious intent from seizing a system and creating malfunctions. For instance, a hacked automobile moving arbitrarily may be because of this reason. As discussed above, an existing computer system structure merely excludes a computer of which a malfunction is detected or uses another computer within the system to substitute for the malfunctioning computer and does not use another computer either for restoring or for maintaining a normal operation of the computer experiencing the malfunction itself. Also, while there are cases in which a computer detected as having a malfunction is reset and made to perform its tasks again, in such cases also, software that has acquired the authority of a supervising administrator would still be able to control the entire system through the OS, so that there are no available countermeasures against malicious code seizing a system and causing malfunctions. A fundamental reason for the problems described above is that existing computer systems only use softwares to cope with the malfunctions caused by malicious code or malicious manipulation without hardwares. Thus, in order to prevent malfunctions in the system caused by malicious code, etc., there is a need for a computer system that is structurally complemented by hardwares.

SUMMARY OF THE INVENTION

The concept of using another computer for monitoring or restoring a general-use small-scale computer device such as a PC, laptop, and mobile phone frequently used by the public entails a functional need but also greatly increases the cost of the computer. Also, when there were no hardware problems, there was no such need, as typical errors occurring under complete control of the user were all caused by software.

However, due to advances in the Internet and various communication methods, today's computers are connected to communication networks virtually throughout the day and are frequently infected by malicious programs such as hacking programs or computer viruses due to defects in the OS itself or due to user negligence, etc., to be uncontrollable.

A computer in uncontrollable state by user may halt or deceive vaccine programs and is controlled by the hacker or virus distributor without the user or the OS aware of the situation. Such a computer can only be treated when a user that has perceived a malfunction runs a vaccine program or a very special measure (such as running a vaccine program after booting Windows in safe mode, for example) and, even then, may not be treated if the vaccine program manufacturer does not have a solution to the malicious code.

As such, the inventor proposes a computer that has an isolated user computing unit to cope with attempts at seizing the system with malicious code and minimize damage to the system.

To resolve the problems above, a computer based on the present invention includes a security management computing unit and a user computing unit, where the security management computing unit is hardware-wise connected directly with I/O devices and controls the I/O devices and, in particular, manages an auxiliary storage device unit divided into a part for security management computing and a part for user computing, and where the user computing unit is hardware-wise isolated or separated from the I/O devices and in particular the auxiliary storage device unit that those are connected with the above user computing unit under the control of the security management computing unit, has a separate CPU and memory, and is connected to the security management computing unit by way of a separate communication interface, and executes user programs on a user OS. In other words, the present invention presents a computer, as well as a basic structure for software used on the computer, where the user programs and the user OS are run on the user computing unit that is isolated from the security management computing unit, and functions related to the I/O devices or functions for monitoring and restoration are run on the security management computing unit.

A computer according to a first aspect of the present invention includes a security management computing unit, which in turn includes a first central processing unit (CPU) having first address bus, first data bus, and first control bus signals; a first memory unit connected to the first central processing unit by way of the first address bus, first data bus, and first control bus signals; an auxiliary storage device unit such as HDD, etc., connected to the first central processing unit by way of the first address bus, first data bus, and first control bus signals; and an I/O (input/output) device connected to the first central processing unit by way of the first address bus, first data bus, and first control bus signals; and a user computing unit, the user computing unit comprising: a second central processing unit (CPU) having a second address bus, a second data bus, and a second control bus; and a second memory unit connected to the second central processing unit by way of the second address bus, the second data bus, and the second control bus, and a user computing unit, which in turn includes a second central processing unit (CPU) having second address bus, second data bus, and second control bus signals; and a second memory unit connected to the second central processing unit by way of the second address bus, second data bus, and second control bus signals. The security management computing unit performs I/O device management, system monitoring and restoration, and the monitoring and control of the user computing unit, and the user computing unit runs user programs and a user OS while isolated from the security management computing unit.

Here, an intercommunication unit, which is connected to the first central processing unit of the security management computing unit by way of the first address bus, first data bus, and first control bus signals and is connected to the second central processing unit of the user computing unit by way of the second address bus, second data bus, and second control bus signals to be present between the first central processing unit and the second central processing unit, handles the communication between the security management computing unit and the user computing unit.

The auxiliary storage device unit can include a security management computing storage area that is used solely by the security management computing unit and is not exposed to the user computing unit, and a user computing storage area that is used by the user computing unit under the control of the security management computing unit. Here, an original version of the user OS running on the user computing unit can be stored in the user computing storage area, and a duplicated version of the user OS can be stored in the security management computing storage area.

A computer according to a second aspect of the present invention includes a security management computing unit, which in turn includes a first central processing unit having multiple dedicated hardware interfaces; a first random access memory (RAM), a graphic controller unit, a first boot memory (non-volatile memory such as ROM or flash memory), a peripheral device controller hub unit, and an intercommunication unit, and those units are connected independently to the first central processing unit by using the above dedicated interfaces; and an input/output unit and an auxiliary storage device unit connected to the peripheral device controller hub unit, and a user computing unit, which in turn includes a second central processing unit that is connected with the intercommunication unit by way of a first dedicated interface, connected with a second random access memory by way of a second dedicated interface, and connected with a second boot memory (non-volatile memory such as ROM or flash memory) by way of a third dedicated interface. Here, the boot memory can in some cases be connected to the peripheral device controller hub. Also, the security management computing unit performs I/O device management, system monitoring and restoration, and the monitoring and control of the user computing unit, and the user computing unit runs user programs and a user OS while isolated from the security management computing unit.

Here, the auxiliary storage device unit can include a security management computing storage area that is used solely by the security management computing unit and is not exposed to the user computing unit, and a user computing storage area that is used by the user computing unit under the control of the security management computing unit. Here, the original version of the user OS running on the user computing unit is stored in the user computing storage area, and the duplicated version of the user OS is stored in the security management computing storage area.

A computer according to a third aspect of the present invention includes a security management computing unit, which manages an auxiliary storage device unit and I/O devices that are connected thereto, and a user computing unit, which is isolated from the I/O devices, has a separate CPU and memory, and is connected to the security management computing unit, where the security management computing unit performs I/O device management, system monitoring and restoration, and the monitoring and control of the user computing unit and relays and monitors communications with the I/O devices according to the request of the user computing unit, and the user computing unit runs user programs and a user OS while isolated from the security management computing unit. Communications between the security management computing unit and the user computing unit are handled by an intercommunication unit.

In computers having the features of the several aspects disclosed above, the intercommunication unit can include a dual port memory that is connected to the first central processing unit, which forms a part of the security management computing unit, by way of the first address bus, first data bus, and first control bus signals and connected to the second central processing unit, which forms a part of the user computing unit, by way of the second address bus, second data bus, and second control bus signals.

Also, the intercommunication unit can include an interrupt register that is connected to the first central processing unit by way of the first address bus, first data bus, and first control bus signals. Here, the user computing unit can further include a means for providing a list of running software and process information via the intercommunication unit when an interrupt signal is received from the security management computing unit via the interrupt register. Also, the user computing unit can further include a means for selectively halting the running of a running software and process by using information provided via the intercommunication unit when an interrupt signal is received from the security management computing unit via the interrupt register.

In another embodiment, the intercommunication unit can include a DMA (direct memory access) interface that is connected to the first central processing unit, which forms a part of the security management computing unit, by way of the first address bus, first data bus, and first control bus signals and is connected to the second central processing unit, which forms a part of the user computing unit, by way of the second address bus, second data bus, and second control bus signals.

The auxiliary storage device unit can include a security management computing storage area that is used solely by the security management computing unit and is not exposed to the user computing unit, and a user computing storage area that is used by the user computing unit under the control of the security management computing unit. Here, the original version of the user OS running on the user computing unit can be stored in the user computing storage area, and the duplicated version of the user OS can be stored in the security management computing storage area. The terms original and duplicated are used for the sake of convenience from the perspective of the user, and the term duplicated can be substituted by a back-up of the original at a particular time point.

According to an embodiment of the present invention, the security management computing unit can selectively provide the duplicated version of the user OS stored in the security management computing storage area during a booting of the user computing unit.

Also, according to an embodiment of the present invention, a mouse unit and/or a keyboard unit as the I/O device are additionally included. The user computing unit performs information input/output with the keyboard unit and the mouse unit via the intercommunication unit under the control of the security management computing unit.

Also, according to an embodiment of the present invention, access to the security management computing unit can be performed by way of a password recognition procedure that is independent of the user computing unit.

Also, according to an embodiment of the present invention, the security management computing unit can further include a means for controlling the execution time or the execution permission of a program executed on the user computing unit.

Also, according to an embodiment of the present invention, when the user computing unit transfers information for outputting to the I/O device via the intercommunication unit, the security management computing unit can store some portion of the information for outputting in the security management computing storage area and provide the above portion of information when there is a request by the user who logged on the security management computing unit.

Also, according to an embodiment of the present invention, the security management computing unit, upon receiving a request from the user computing unit to change a file system of the user computing storage area of the auxiliary storage device unit, can store restoration information of the existing file system in the security management computing storage area of the auxiliary storage device unit.

Also, according to an embodiment of the present invention, a video display unit can be included, which in turn includes a first video memory connected to the security management computing unit; a second video memory connected to the security management computing unit and the user computing unit; and a video graphic controller connected to the security management computing unit and configured to selectively display information from the first video memory and the second video memory on a monitor display screen. Here, in cases where high-speed graphic processing is required, a GPU can be added to the user computing unit. In such case also, however, it is preferable to modify the architecture such that the GPU is able to access the second video memory directly. In any case, it is preferable to maintain an architecture with which the security management computing unit provides a screen independently to the security administrator or user.

In this case, the security management computing unit can store the information of the second video memory in the security management computing storage area of the auxiliary storage device unit in a manner configured by a user of the security management computing unit and provide the information when there is a request by a user of the security management computing unit.

Also, the security management computing unit, upon receiving a request from the user computing unit to change an executable file or registry file stored in the auxiliary storage device unit, can show the request via the video display unit and receive confirmation by way of a keyboard input.

Also, the OS operated on the security management computing unit can further include a means for controlling the video display unit to selectively display content from the first video memory or content from the second video memory according to a hardware input by a user. In this case, the hardware input can be a keyboard input.

Yet another aspect of the present invention provides a keyboard that has a dedicated key for the keyboard input described above.

In a computer based on the present invention having the features above, the user OS transferred to the user computing unit is provided selectively according to circumstances as the original or the duplicated version. If the original version of the user OS stored in the user computing storage area is damaged by malicious code, it is possible to perform normal booting by using the undamaged and duplicated version stored in the security management computing storage area when the computer is newly booted. Here, the user can command a booting using the duplicated version by using one of the I/O devices of the security management computing unit. In the case of a conventional Windows OS, the user OS being booted may be changed to the duplicated version when a particular key of the keyboard is pressed, and in cases where an OS other than Windows is used, it can be preferable to separately provide an independent switch input and change the user OS to the duplicated version based on the input value of this switch.

Also, in a computer based on the present invention having the features above, the security management computing unit, after detecting a malfunction, can stop or reset the user computing unit or generate an interrupt signal to perform a function of halting or restoring the malfunction. For example, if there is a request from the user computing unit to change the registry or a driver file, it is possible to respond to the request by refusing the change and warning the user, etc.

Also, with a computer based on the present invention having the features above, the I/O devices are, from the perspective of hardware, connected directly with the security management computing unit but connected selectively with the user computing unit such as by way of information exchange, etc., via the intercommunication unit (for example, by transferring the address of the I/O device and the action type, such as read, write, etc., to the security management computing unit and receiving the result after the security management computing unit performs the action, or if the device is a printer, by specifying an I/O device and transferring the data that is to be printed to the security management computing unit for processing, etc.), and the software of the security management computing unit related to the I/O devices cannot be freely accessed by the user computing unit and can be changed, installed, or deleted only under limited conditions. In this way, the security management computing unit can manage the I/O devices and can monitor inappropriate movement of data or inappropriate use of a computer I/O device. For example, if the hardware address presented by the user computing unit is a printer device, communications with this device can be monitored and recorded, to be provided to the security administrator.

Although with a computer based on the present invention having the features above it is preferable that the user programs and user OS be run generally at the user computing unit, these can be divided into a security management computing unit part and a user computing unit part so as to enable parallel execution for improved computation speed. For example, with regard to the composition of the screen when accessing the Internet, the parts related to the graphics can be handled by the security management computing unit, while the remaining parts can be handled by the user computing unit, thereby increasing the processing speed. Also, if, for example, parts such as a real-time update module of a user program or user OS or a real-time monitoring module of a virus vaccine program are executed at the security management computing unit, this provides greater safety, prevents infections by malicious code, and also increases processing speed.

Also, in a computer based on the present invention having the features above, the security management computing unit can further include a means for controlling the running time or blocking the running of a program executed on the user computing unit. Even if the user computing unit makes a request, it would be possible, based on the information configured at the security management computing unit, to refuse the providing of program information or, even after the execution is permitted, to periodically call an interrupt on the user computing unit to check the process list and forcibly stop the running when the designated running time is exceeded. When necessary, it is also possible to store the screen of the user computing unit. To this end, it is preferable that, in a computer based on the present invention, access to the security management computing unit entails a password recognition procedure that is independent of the user computing unit.

Also, in a computer based on the present invention having the features above, the user computing unit can further include an additional I/O device that is independent of the security management computing unit. With such composition, however, it would be difficult to control malicious code entering via the I/O devices. In this case, it would be preferable to block the execution of programs provided by the added I/O devices. However, in any case, the security management computing unit may manage the auxiliary storage device, so as to allow monitoring and restoration even in the event of a malicious code infection.

Also, in a computer based on the present invention having the features above, the security management computing unit can have a system OS for convenience. Here, there would be no problem even if this system OS is different from the user OS of the user computing unit. However, from the perspective of managing the auxiliary device memory unit or controlling the I/O devices, it would be preferable that the OS elements including the file system be the same. In the case of Windows, the OS most widely used, the user computing unit may use conventional Windows as the OS, while the security management computing unit may use a system OS that has been modified by reducing the safe mode functions of Windows and adding the various functions mentioned above to further limit access by users.

With the present invention, a software program can be used which may be run on a computer having the features above and which may have the code or data of the program divided into a first software module that is executed on the security management computing unit and a second software module that is executed on the user computing unit.

It is also possible to implement this software program in the form of a computer-readable recording medium that can be read by a computer. Here, the recording medium readable by a computer includes all types of recording devices on which data that can be read by a computer system is recorded. Examples of a recording medium readable by a computer include ROM, RAM, CD-ROM, magnetic tape, a floppy disk, an optical data storage device, etc. Also, a computer-readable recording medium can be distributed over a computer system connected by way of a network so as to store and run computer-readable code in a distributed manner.

In the software program, the first software module and the second software module of the software program can exchange information via the intercommunication unit.

Also, the first software module of the software program can be a real-time update module responsible for updating software or a real-time monitoring module associated with a program for monitoring malicious code.

The composition and advantageous effects of the present invention introduced above will be more clearly understood from the descriptions of specific embodiments provided below with reference to the accompanying drawings.

DETAILED DESCRIPTION OF THE INVENTION

Below, a description is provided of a few embodiments that are specific implementations derived from the spirit of the present invention introduced above. However, the technological scope of the present invention is not limited to the embodiments and drawings set forth below but rather is defined by a reasonable interpretation of the scope of claims.

Figure 1:
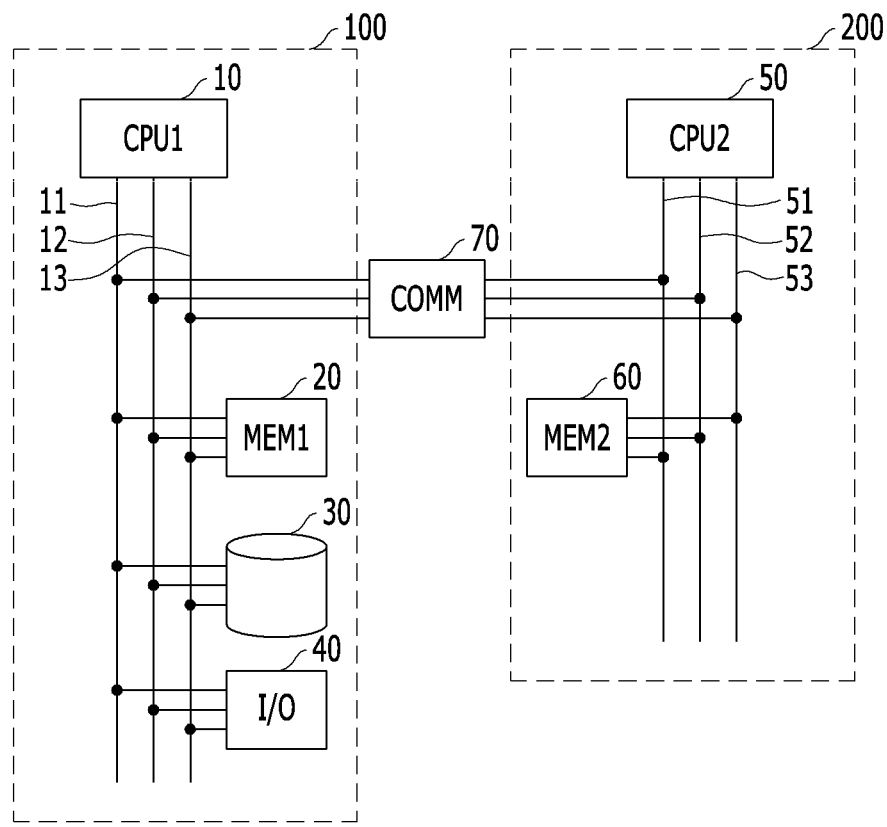
FIG. 1 is a structural diagram of a computer device according to an embodiment of the present invention.

FIG. 1 is a structural diagram of a computer device according to an embodiment of the present invention. The structure largely includes a security management computing unit 100 and a user computing unit 200.

The security management computing unit 100 includes a first central processing unit (CPU) 10 having first address bus 11, first data bus 12, and first control bus 13 signals; a first memory unit 20 connected to the first central processing unit (CPU) 10 by way of the first address bus 11, first data bus 12, and first control bus 13 signals; an auxiliary storage device unit 30, such as HDD, etc., connected to the first central processing unit 10 by way of the first address bus 11, first data bus 12, and first control bus 13 signals; and an input/output (I/O) device unit 40 connected to the first central processing unit 10 by way of the first address bus 11, first data bus 12, and first control bus 13 signals.

The user computing unit 200 includes a second central processing unit (CPU) 50 having second address bus 51, second data bus 52, and second control bus 53 signals; and a second memory unit 60 connected to the second central processing unit (CPU) 50 by way of the second address bus 51, second data bus 52, and second control bus 53 signals.

Also included is an intercommunication unit 70 that is connected to the first central processing unit 10 of the security management computing unit 100 by way of the first address bus 11, first data bus 12, and first control bus 13 signals and connected to the second central processing unit 50 of the user computing unit 200 by way of the second address bus 51, second data bus 52, and second control bus 53 signals so as to handle communications between the first central processing unit 10 and the second central processing unit 50.

According to one embodiment, the intercommunication unit 70 includes an interrupt register that is connected with the first central processing unit 10 by way of the first address bus 11, first data bus 12, and first control bus 13 signals. The output signal of this register can be connected to an interrupt signal input of the second central processing unit 50. Here, the user computing unit 200 can, upon receiving an interrupt signal from the security management computing unit 100 via the interrupt register, provide a list of running software and process information through the intercommunication unit 70. Also, upon receiving an interrupt signal from the security management computing unit 100 via the interrupt register, the user computing unit 200 can use the information provided via the intercommunication unit 70 to selectively halt the execution of running software and processes.

In most cases, since a CPU is capable of processing several interrupts, it is also possible to differentiate the interrupts according to the type of task. Furthermore, it is possible for the user computing unit to keep the physical address of an interrupt program to be executed in a flash memory that can be written only by the security management computing unit, so that just one interrupt line may be used, but with the program varied each time.

According to another embodiment, the intercommunication unit 70 can include a dual port memory that is connected with the first central processing unit 10 by way of the first address bus 11, first data bus 12, and first control bus 13 signals and connected with the second central processing unit 50 by way of the second address bus 51, second data bus 52, and second control bus 53 signals. As the dual port memory inherently allows simultaneous access by the security management computing unit and the user computing unit, it can be useful in transferring small amounts of data. Also, a portion of the dual port memory can be formed with flash memory with writing allowed only for the security management computing unit, and the starting address of the interrupt processing program indicated by an interrupt vector of the user computing unit physically pointing to the dual port flash memory.

According to still another embodiment, the intercommunication unit 70 can include a DMA interface that is connected with the first central processing unit 10 by way of the first address bus 11, first data bus 12, and first control bus 13 signals and connected with the second central processing unit 50 by way of the second address bus 51, second data bus 52, and second control bus 53 signals. If this DMA interface is designed for two-way communication, it can be useful in sending and receiving large amounts of data, such as files stored in an auxiliary storage device for example, between the security management computing unit and the user computing unit.

The security management computing unit 100 monitors and controls all I/O devices 40 and, in particular, performs management and restoration functions for the auxiliary storage device unit 30 which is divided into a security management computing storage area and a user computing storage area. The user computing unit 200 is isolated from the I/O devices 40, has a separate CPU and memory, and is connected to the security management computing unit 100 via the intercommunication unit 70 to execute user programs and a user OS.

Figure 2:
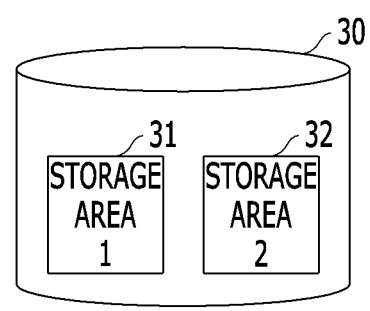
FIG. 2 is a conceptual diagram of an auxiliary storage device unit 30.

FIG. 2 conceptually illustrates the composition of the auxiliary storage device unit 30. The unit is physically or logically separated into Storage Area 1 and Storage Area 2, which represent the security management computing storage area 31 used by the security management computing unit 100 and the user computing storage area 32 used by the user computing unit 200, respectively. Between the two, the security management computing storage area 31 is not exposed to the user computing unit 200. In other words, it is preferable to divide a storage device (e.g. HDD) into partitions, with the partition used by the security management computing unit 100 configured to be the security management computing storage area 31, but with this area configured not to be exposed to the user computing unit 200. Besides using such partitioning, it is also possible to use two physically separated HDD's. Also, for improved speed, it may be more preferable to use a storage device formed with flash memory.

As an alternative, another possible method would be for the security management computing unit 100 and the user computing unit 200 to use a whole HDD together but with the files or sectors used by the security management computing unit 100 unexposed to the user computing unit 200. In this case, the file system exposed to the user computing unit 200 would appear as a single continuous space, but since it has to be determined who is actually using each of the individual sectors, there is the drawback that the managing of the file system becomes difficult. However, when the user computing unit 200 changes a file, the security management computing unit 100 may merely change the attribute of the file to one used by itself for managing, so that a considerable reduction of time may be achieved when performing a backup.

Figure 3:
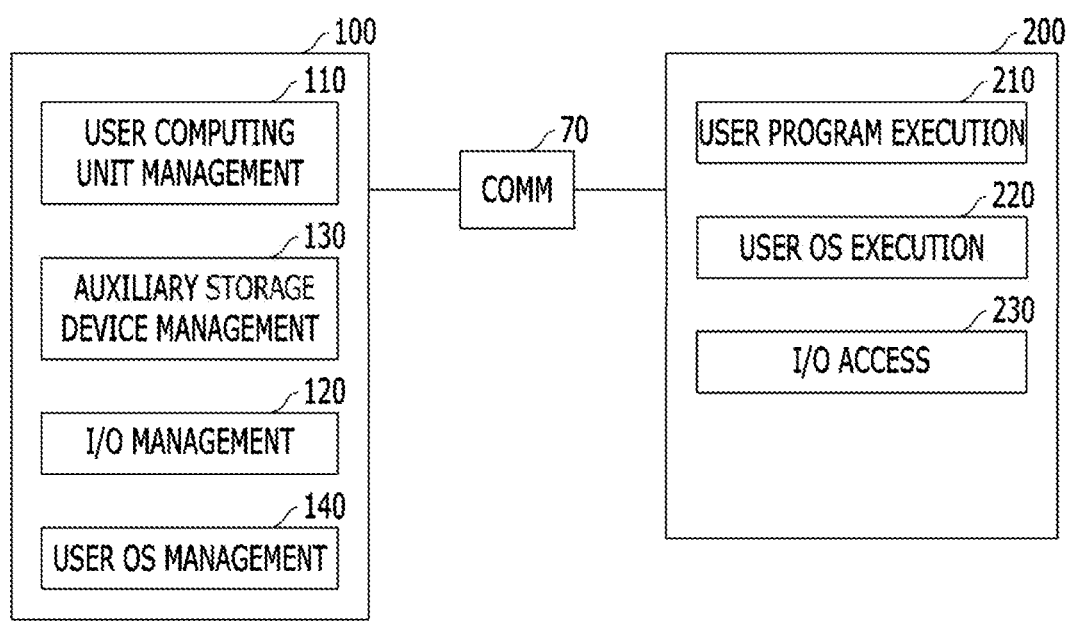
FIG. 3 is a functional diagram of the security management computing unit 100 and the user computing unit 200.

FIG. 3 shows a functional composition of the security management computing unit 100 and the user computing unit 200.

Each module shown in FIG. 3 represents a software composition for implementing a respective individual function of the first central processing unit 10 of the security management computing unit 100 or the second central processing unit 50 of the user computing unit 200 and may be operated without a particular piece of hardware or with a particular piece of hardware if needed.

A description of the composition and actions of the present invention is provided below with reference to FIG. 1 to FIG. 3 mentioned above.

In one embodiment, a user program is executed at a user program execution module 210, which is an element included as a functional unit in the user computing unit 200 (i.e. in the second central processing unit 50), and here an isolated user program having a security lock and unlock process isolated from the security management computing unit 100 is executed. Also, a user OS execution module 220 and an I/O access module 230 are included in the user computing unit 200 (i.e. the second central processing unit 50). These elements are described later on.

The security management computing unit 100 (i.e. the first central processing unit 10) includes a user computing unit management module 110 that monitors and controls the user computing unit 200, an I/O management module 120 that monitors and controls the I/O devices 40, and an auxiliary storage device management module 130 that manages the auxiliary storage device unit 30 which is divided into a storage area for security management computing and a storage area for user computing, as illustrated in FIG. 2, so as to perform a restoration function. In addition to these, the security management computing unit 100 further includes a user OS management module 140. These modules 110~140 may be included as software function blocks in the first central processing unit 10 of the security management computing unit 100.

A user OS execution module 220, for example, of the user computing unit 200 runs a user OS program and data, in which case the user OS execution module 220 depends on the auxiliary storage device unit 30, which is managed by the security management computing unit 100, for the program and data, including the user OS. That is, for the user OS data run on the user computing unit 200, the user OS management module 140 of the security management computing unit 100 stores the original version of the user OS in the user computing unit storage area 32 of the auxiliary storage device unit 30 in the security management computing unit 100 and stores the duplicated version of the user OS in the security management computing storage area 31. During execution, the original version is transferred from the security management computing unit 100 to the user computing unit 200 via the intercommunication unit 70 to be installed and run on the second memory unit 60.

Also, the I/O access module 230, for example, of the user computing unit 200 depends on the security management computing unit 100 for accessing the I/O devices 40 located at the security management computing unit 100. That is, I/O devices such as a keyboard, a mouse, and a general communication interface such as USB or LAN, for example, are connected hardware-wise to the I/O management module 120 of the security management computing unit 100 and selectively connected to the I/O access module 230 of the user computing unit 200 by way of driver software or simulation software. Here, the security management computing unit 100 is formed such that user access is strictly managed and such that any change or installation of a program is impossible as a rule. With this stricture, the security management computing unit 100 in fact acts as a third party to monitor the operations of the user computing unit 200, which has the structure of a conventional computer.

The I/O management module 120 of the security management computing unit 100 manages all I/O devices 40 and monitors for any inappropriate movement of data or any inappropriate use of the computer. For example, the screen of the display or the input through the keyboard can be recorded, to thereby monitor inappropriate use. While a computer in which a single OS oversees the entire system as in the related art is also capable of recording, the supervising administrator is able to access the recorded information, so that when the records are deleted or altered, there is a vulnerability in security. As such, a computer device according to the present invention would be very useful in corporate or military environments, etc., where security is essential. In such cases, it is possible for a security department to monitor and control the work content or security issues of the overall computer via a security network. Here, the security network is not exposed to the user computing unit thus providing greater safety.

Also, when an input/output device connected to an I/O device attempts to transfer a program code, the security management computing unit 100 transfers this via the intercommunication unit 70 to the user computing unit 200, and the user computing unit 200 executes the code.

To provide a description of the operations of the user computing unit 200 with respect to each I/O device connected to the security management computing unit 100, for a keyboard unit and a mouse unit coupled to the security management computing unit 100, the user computing unit 200 may perform information input/output with the keyboard unit and mouse unit under the control of the security management computing unit 100 (e.g. by way of the functions of the I/O management module 120) via the intercommunication unit 70. For a USB unit coupled to the security management computing unit 100 also, the user computing unit 200 may perform information input/output with the USB unit under the control of the security management computing unit 100 via the intercommunication unit 70. For a PCI unit coupled to the security management computing unit 100 also, the user computing unit 200 may perform information input/output with the PCI unit under the control of the security management computing unit 100 via the intercommunication unit 70. For a LAN unit coupled to the security management computing unit 100 also, the user computing unit 200 may perform information input/output with the LAN unit under the control of the security management computing unit 100 via the intercommunication unit 70. Communications with these I/O devices can be performed individually by specifying the hardware address, input/output information, and input/output operations for the devices, but since the functions of the I/O devices are designated, the processing for certain I/O devices can be performed in a simpler manner, such as by providing print information and a command 'output to device' for a printer module and by providing a file name and a command 'copy to device' for an external auxiliary storage device.

The user computing unit management module 110 of the security management computing unit 100 has the function of checking and monitoring the operations of the user computing unit 200. This function, in certain cases, can include halting or restoring a malfunction by way of a method such as stopping or resetting the second central processing unit 50 or generating an interrupt signal to execute a particular program, etc.

The user computing unit management module 110 can also have a function of providing implementation such that, from among the code executed on the user program execution module 210 or the user OS execution module 220 of the user computing unit 200, the portions that can be managed safely may be executed in parallel on the security management computing unit 100 as well. For example, if updates to the OS or a program, the real-time monitoring of a virus vaccine program, etc., are performed by the security management computing unit 100, then other tasks can be performed more quickly compared to when the user computing unit 200 performs such tasks.

Also, when connecting to the Internet for example, the user computing unit management module 110 may be configured such that, with regard to the composition of the screen, parts related to the graphics are handled by the security management computing unit 100 and the remaining parts are handled by the user computing unit 200. This would allow faster operations.

As described above, in a computer based on the present invention, all software operated on the computer may have the program code or data separated into portions that are run on the security management computing unit 100 and portions that are run on the user computing unit 200. Here, a portion run on the security management computing unit 100 may be an update module that is responsible for updating the software of the OS or a user program.

Also, if the operation of the user computing unit 200 while accessing the Internet arouses suspicion, it is possible for the security management computing unit 100 to not send the keyboard input to the user computing unit 200 but transmit the input directly to the accessed Internet site. In this case, it is possible to send characters such as '*' that replace the keyboard input to the user computing unit 200 and show the actual information inputted by the user on the screen used by the security management computing unit 100.

Also, a computer based on the present invention enables a parent to easily monitor children's viewing of pornography or excessive access to game sites in the home. By adding this type of a function to the user computing unit management module 110 of the security management computing unit 100 and configure the settings such that children can access only the user computing unit 200, it is possible to control the running time of a particular program or block its execution entirely under the control of the security management computing unit 100, as well as to capture and store the screen. As the above situations can be monitored in real time with the parent's mobile phones over a communication network, the parent is able to effectively prevent immoderate use of the computer by the children. In this case, the system can be connected with the parent's mobile phone via Bluetooth, a wireless LAN, a public data network, etc., where a dedicated app would allow greater convenience.

For this function, the video display unit for the monitor would have to include a first video memory (not shown) connected to the security management computing unit 100; a second video memory (not shown) connected to the security management computing unit 100 and the user computing unit 200; and a video graphic controller that is connected to the security management computing unit 100 and selectively shows information from the first video memory and the second video memory on a monitor display screen.

The security management computing unit 100 connected with such a video display unit, upon receiving a request from the user computing unit 200 to change information stored in a particular area of the auxiliary storage device unit 30, may perform an operation for displaying the request via the video display unit and requiring confirmation from the user (e.g. a keyboard input).

Also, the security management computing unit 100 may store the information of the second video memory in the security management computing storage area 31 of the auxiliary storage device unit 30 in a manner configured by the user of the security management computing unit 100 and provide the information when there is a request by the user.

The present invention also includes software, as a system OS operated on the security management computing unit 100, that provides the function of controlling the video display unit to selectively display content from the first video memory or content from the second video memory according to the hardware input of the user. In this case, a keyboard having a dedicated key for the hardware input by the user would provide greater convenience.

If a program for responding to a malfunction in the user computing unit 200 resulting from an invasion by a hacker or a virus is provided in the user computing unit management module 110 and the auxiliary storage device management module 130 of the security management computing unit 100, this would enable an effective response against hacking or viruses. Whereas the structure of an existing computer finds malfunctions from viruses at a later time using a vaccine program or by other methods, the present invention has the security management computing unit 100 monitoring the operations of the user computing unit 200 (or in this case, the operations of the virus) in real time, so that a countermeasure may be applied immediately.

For example, in cases where there is a virus invasion and the virus modifies a file content to hide in a file stored in a hard disk, an existing computer would find this later on with a vaccine program after the file has been modified, but with a computer device according to the present invention, it is possible to block the modification of the file in real time. Moreover, while some known viruses may be blocked with a real-time monitoring function of an existing computer vaccine program, such programs are incapable of responding to newly developed viruses and pose problems in security especially when the vaccine programs have not been updated. In contrast, a computer device according to the present invention, for an OS such as Windows, can have the security management computing unit 100, which acts as a third party, block any changes by a virus to the file system or to the registry, thereby providing a more fundamental countermeasure even when the virus attempts access with the authority of a supervising administrator.

Furthermore, with a computer according to the present invention, the auxiliary storage device management module 130 of the security management computing unit 100 controls the auxiliary storage device unit 30 such as a hard disk, etc., so that various security functions can be implemented with greater convenience.

For example, as mentioned above, the security management computing storage area 31 of the auxiliary storage device unit 30 used by the security management computing unit 100 can be configured or structured to be completely unexposed to the user computing unit 200. Thus, this storage area becomes very safe from attacks by malicious code.

Therefore, if the user computing unit 200 demands a change in the file system, the file system may be changed with backup information for the file system stored in the security management computing storage area 31, so that the file system may be restored at a specified time even when a problem occurs. That is, when a demand is received from the user computing unit 200 to change the file system of the user computing storage area 32, the security management computing unit 100 stores restoration information for the existing file system in a specified portion of the security management computing storage area 31, which is used solely by the security management computing unit 100. This allows for a safe response, as the above information is not exposed to the user computing unit.

Windows already has a function for a backup of the computer programs and data of a specified time point and using the backup to restore the system as well as a function for restoring the OS if the OS experiences a problem. However, as described above, the existing computer structure in which anyone can access the backup information cannot provide complete security, since malicious code can access the backup information as well. For example, if a hacking program or a virus program attempts to destroy a hard disk, the existing computer would blindly follow the command of the malicious code unaware of the program's nature, causing the computer to fall into an inoperable state. For example, if a ransomware randomly attempts to encrypt user files, the computer performs the encryption task completely unaware.

However, in a computer according to the present invention, the security management computing unit 100 (e.g. the user computing unit management module 110) can monitor the operation of the user computing unit 200, so that when an OS file or a data file is changed or deleted, a backup information file may be created in a safe place to allow easy restoration. Also, upon receiving a command to delete, etc., these files, the security management computing unit 100 can again require confirmation from the user, thereby greatly increasing security. With an existing computer, certain types of malicious code can infect the keyboard driver and generate a fake confirmation input when user confirmation is needed to skip the additional confirmation by the user, but with a computer according to the present invention, the additional confirmation by the user is performed at the security management computing unit 100, so that the malicious code is unable to input a fake confirmation.

Typically, current PC type computer devices mostly use a GPU for high-speed graphics processing. While a GPU can be regarded as being similar to the isolated user computing unit 200 of the present invention in that it has its own isolated code and work area, there is a fundamental difference in that there are no hardware or software structure by which the CPU monitors the tasks of the GPU and makes a restoration in the event of a malfunction. That is, as the structure does not involve two central processing units coupled together with the purpose of one central processing unit detecting and responding to malfunctions in the other, the GPU does not use other I/O devices, does not include an OS, and does not use an auxiliary storage device having separated areas.

A more specific description is provided below of the detailed operations of a computer based on the present invention having the composition described above.

1-1. Booting

When power is supplied and booting begins, BIOS codes are executed for the security management computing unit 100 and the user computer, respectively. Here, the booting processing module (not shown) of the first central processing unit 10 of the security management computing unit 100 performs a POST (power-on self-test) for the I/O devices 40 and memories and reads the system OS from a connected hard disk, i.e. an auxiliary storage device unit 30. (Here, it is assumed that the capacity of the hard disk is sufficient to include both the user computing storage area 32 and the security management computing storage area 31 in a single hard disk. That is, it is assumed that a portion of the hard disk is configured as the security management computing storage area 31.) Meanwhile, the booting processing module (not shown) of the user computing unit 200 also begins booting, performs self-tests for the memory and the intercommunication unit 70, and requests the user OS data (the OS of the user computing unit 200) and the POST results of the I/O devices 40 from the security management computing unit 100 via the intercommunication unit 70.

The security management computing unit 100 transfers the POST results and the user OS data through the intercommunication unit 70, and the user computing unit 200 uses these to perform the booting procedure. When the user OS is installed normally, the user OS again requests the security management computing unit 100 for the data for start applications according to the profile configured by the user and uses the information to install the start applications in the memory and complete the booting. If the user OS is Windows, the start screen after the booting is completed would show user program icons.

Here, it is not necessary that the OS of the security management computing unit 100 be the same as the OS of the user computing unit 200. However, a considerable synergetic effect in work capability can be expected if at least some portions are shared. For example, if the OS of the security management computing unit 100 is an OS corresponding to a safe mode booting of Windows, and if the OS of the user computing unit 200 is Windows, then it would be possible for the security management computing unit 100 to update programs or the OS or even run a real-time monitoring module of a vaccine program to check for suspicious program code in real time.

1-2.

Before the OS booting, it is possible for the BIOS processing module (not shown) of the security management computing unit 100 to change the function of the BIOS of the user computing unit 200.

Consider a case of changing certain BIOS functions by using the interrupt register (not shown) or the intercommunication unit 70. If the interrupt register is composed of 16 bits, then since each bit can transfer one piece of ON/OFF information, these can be used for various purposes. For example, suppose that Bit 0 of the interrupt register is connected to the NMI line of the user computer directly, Bit 1 is connected to the POR (power-on reset) signal and the OR gate of the user computer, and Bit 15 represents a BIOS change. Also, suppose that the interrupt register is set to 0 at power on and that the current value of the interrupt register can be read from both the security management computing unit 100 and the user computing unit 200.

If a change is needed for the BIOS of the user computing unit 200 during booting, the BIOS processing module of the security management computing unit 100 sets Bit 15 of the interrupt register and stores data where the change is needed in the intercommunication unit 70 (supposing that the intercommunication unit 70 is a DPRAM (dual port RAM)).

After power is supplied, the BIOS processing module (not shown) of the user computing unit 200 reads Bit 15 of the interrupt register to check whether or not a change of the BIOS is needed and, if it is checked that a change is needed, reads the information through the intercommunication unit 70 to change the BIOS. When the change is complete, this is notified again to the security management computing unit 100 via the intercommunication unit 70, and the user computing unit 200 itself proceeds with the booting again from the beginning. The security management computing unit 100 clears Bit 15 of the interrupt register to clear the BIOS change.

Here, it is preferable that the WR (write) signal for the BIOS of the user computing unit 200 be controlled by way of a hardware-wise separate register. That is, by having the BIOS processing module of the user computing unit 200 allow writing in its BIOS memory (not shown) only when permitted by the BIOS processing module of the security management computing unit 100, any change to the BIOS by malicious code can be prevented. That is, as applying an output from a separate register and a WR signal through an AND gate to the WR input of the BIOS memory would allow the transfer of the WR signal only when the corresponding bit is 1, writing would be possible during booting only when permitted by the security management computing unit 100.

1-3.

The I/O management module 120 of the security management computing unit 100 provides information according to the settings on peripheral devices connected with the input/output device unit 40 via the intercommunication unit 70 to the I/O access module 230 of the user computing unit 200.

When the connections of the peripheral devices are recognized, the I/O access module 230 of the user computing unit 200 requests the necessary drivers from the user computing unit management module 110 of the security management computing unit 100, installs the devices, and adds the devices to its list of peripheral devices. This peripheral device list and information are shared with the security management computing unit 100 (for instance, with the I/O management module 120). Reading and writing for the peripheral devices transferred via the intercommunication unit 70 are performed by the security management computing unit 100 (for instance, by the I/O management module 120), and the results are transferred to the user computing unit 200 via the intercommunication unit 70. That is, the driver for the corresponding device is present in the user computing unit 200, and the security management computing unit 100 handles simple hardware input/output according to the requests of the user computing unit 200. Here, a simple input/output may be formed as a block for an extension to the movement of a data block.

For example, when a printer is connected via a USB, the I/O management module 120 of the security management computing unit 100 recognizes the connection and transfers relevant information via the intercommunication unit 70 to the I/O access module 230 of the user computing unit 200. The user computing unit 200 analyzes the received information and, upon confirming that the device is a printer, installs a driver for the printer.

The driver is installed in a similar manner to the case of an existing computer. The user computing unit 200 searches the drivers of the auxiliary storage device unit 30 through the intercommunication unit 70 under the control of the security management computing unit 100. This procedure continues until a driver program is found. When a suitable driver program is discovered, the user computing unit 200 installs this to its memory and adds this to its peripheral device list. Although the security management computing unit 100 only provides simple input/output during this procedure, the details related to the connection of the device can be recorded and managed.

However, as mentioned above, there are various management methods for I/O devices. For example, in the case of a printer, the printer driver may be run on the security management computing unit 100, and the user program (e.g. MS Word) of the user computing unit 200 may transfer the information that is to be printed as well as the printer parameters to the security management computing unit and transfer the processing command 'output to device' to perform printing in a simple manner. In this case, care should be taken such that the printer driver is not infected by malicious code.

2. Running an Application Program (User Program)

When the booting is completed, the user program execution module 210 of the user computing unit 200 performs a procedure of confirming the password before permitting access by the user. For example, when a user that has been permitted access executes a browser to reach the Internet, the user OS execution module 220 and the user program execution module 210 of the user computing unit 200 requests the code of the corresponding program from the security management computing unit 100, receives the code, and executes it. Next, when a user accesses a particular Internet site, all this information is relayed through the intercommunication unit 70. For example, if the corresponding site requests the execution of code, such as ActiveX, this is transferred to the user computing unit 200 (or if the security management computing unit 100 runs a real-time monitoring program, this is transferred after a check).

If the corresponding code is malicious code and attempts to change the content of a particular file in the user computing storage area 32 of the auxiliary storage device unit 30 in order to modify a particular program file for hiding, then the user computing unit management module 110 of the security management computing unit 100 shows this on the screen via a video device included in the security management computing unit 100 and prompts the user for confirmation. Here, if there are speakers attached, it is possible to generate a warning alarm. Thus, a preliminary countermeasure may be provided.

3. Infection by Malicious Code

As disclosed above, a vaccine program basically attempts a search by using specific images of malicious codes and is therefore weak against newly developed malicious code. Also, since the user computing unit 200 can have its own input/output devices, infection by malicious code is not something that is impossible. In any case, suppose there is an infection by malicious code. This would mean the malicious code is already hiding in the file system of the user computing unit 200 within the user computing storage area 32 of the auxiliary storage device unit 30 and will perform a malicious action. Supposing the code is ransomware, for example, it may attempt to encrypt the user's document files or work files.

However, with a computer according to the present invention, whenever a file is changed or deleted, a backup image of the file is safely stored by the auxiliary storage device management module 130 (for example, by the auxiliary storage device management module 130) in the security management computing storage area 31 of the auxiliary storage device unit 30, so that on no occasion will all relevant files including the backup images be deleted as in an existing computer. Therefore, when a hacker notifies that there is an infection by making an unjust demand, a user may immediately connect to the security management computing unit 100 to return the file system of the user computing unit 200 to a state before infection. Thus, damage from malicious code may be restored. Here, by checking the records of accesses to sites suspected of causing infection and changing the OS and application programs to before the corresponding time point, the system can be completely restored to normal.

Even if a hacker damages the OS such that the user computing unit 200 is unable to perform any task according to the commands of the hacker, there is still a means of response. This situation may be similar to the case of a malicious computer virus deleting the boot sector or deleting user data. In this case, when the user comes to recognize the situation, the user may respond by bringing up the screen of the security management computing unit 100 through a keyboard input. If the user desires a restoration, the restoration program may use the interrupt register to call an interrupt in the central processing unit of the user computing unit 200 and perform a designated task. Here, since the interrupt service program is stored in non-volatile memory and access is controlled, there is no way for malicious code to block the program. In this manner, it is possible to receive the process list of the user computing unit 200, check the processes, and issue a command to forcibly end a suspicious process. It is also possible to set and then clear the corresponding bits of the interrupt register to forcibly reset the user computing unit 200 and perform the boot process again in a cold start mode. Here, the OS copy of the user computing unit 200 kept in the security computer area of the auxiliary storage device unit 30 may be provided to restore the user computing unit 200 to normal.

Such procedures have to be performed through the screen of the security management computing unit 100, and as such, a user may perform the procedures by using a dedicated keyboard equipped with a key for switching screens to switch from the screen of the user computing unit 200 to the screen of the security management computing unit 100.

4. Printing a File or Monitoring an External Storage Device

Suppose that the user computing unit 200 is operating a word processor and has attempted to print a particular file. Since the printer is connected only to the security management computing unit 100, the user computing unit 200 (e.g. the I/O access module 230) can only issue a command to the printer through a driver program or a simulation program.

Here, the security management computing unit 100 (e.g. the I/O management module 120) relays the communications with the I/O devices according to the requests of the user computing unit 200, and it is possible to record all communications or store the communications according to time intervals designated by the user. Here, the application program that commanded an output to the printer may also be checked from process information. Also, if it is known from the peripheral device information provided by the user computing unit 200 that the equipment is a printer, it would also be possible to employ a more systematic approach by copying and storing the information being outputted midway and providing the information to the security administrator accessing the security management computing unit 100.

In cases where an external storage device is connected, when the external storage device requires executing a driver program or setup program, the program is all transferred to and executed on the user computing unit 200. Thus, records of their connections and communications may all be managed. Furthermore, if the security management computing unit 100 is aware that the corresponding device is an external storage device, it would also be possible to employ a more systematic approach by storing copies of the inputted and outputted files or storing access information and providing such copies or information later on. Also, in cases where the file system of each program can be known, it would be possible to check this at a primitive phase such as from the input screen, so that it is also possible to block in real time the external storage of files including a particular word. Also, the screen of the user computing unit 200 may be stored and provided later, thus providing a strong measure of security.

5. Controlling the Use of Certain Programs

A feature of a computer according to the present invention is that all programs run on the user computing unit 200 are provided by the programs of the security management computing unit 100, and as such, the programs run on the user computing unit 200 can be controlled according to the settings of the user computing unit management module 110 at the security management computing unit 100. For example, many corporations adopt a company policy of prohibiting Internet surfing during work hours, but a worker may avoid surveillance by accessing an external network directly using his or her mobile phone as a medium instead of using the company network. However, a computer based on the present invention can prevent this, since the computer can be set to prohibit the use of the browser entirely or prohibit the use of the browser from 09:00 to 18:00, for example.

If, for example, the browser is included in a list of controlled programs at the security management computing unit 100 through the company network, and the control method is set to allow the program only with the company's permission, then the worker may request the security department for permission to use the browser. If the request is accepted, the security department may change the control method of the security management computing unit 100 through the communication network such that the worker may use the browser from 10:00 to 12:00. Here, it would also be possible to periodically store the user computer screen of the worker for a more thorough monitoring.

6. Accessing the Security Management Computing Unit 100 and Changing Programs In some cases, it may be necessary to add a program to the security management computing unit 100 or update an existing program. Care should be taken in such a case, since this exposes a weak spot in security just as in an existing computer. However, since the security management computing unit 100 inherently only runs limited programs, changes in software configuration would not occur frequently. Thus, the risk of problems occurring may be minimized if a change in software configuration is allowed only by persons in charge of security or from sites confirmed to be secure.

For example, in the context of a company, it is preferable to disallow changes to software configuration made over the network except in the case of a particular address (the security administrator) of the company network. In the case of a private person, a good way would be to allow changes to software configuration only when accessing a site confirmed to be safe.

As access to the security management computing unit 100 requires a password recognition procedure isolated from the user computing unit 200, there would not be a big problem as long as the password is not exposed to the outside. However, for greater security, a hardware-based lock device may be added. That is, a safer access can be ensured through a setup that involves recognizing a hardware key through a separate USB device, etc., that is not connected to the user computing unit 200 and operating software for recognizing the password.

A structure such as that shown in FIG. 1 is illustrated with respect to the basic computer elements of a ROM, RAM, and I/O device. However, in order to increase processing speed, current computers are very often designed to include a high-speed dedicated interface for graphic devices or for a RAM associated with high data traffic or include a hub chip for controlling peripheral devices that separately manages input/output devices having low speed. With respect to the above, FIG. 4 illustrates the structure of a computer according to another embodiment of the present invention.

Figure 4:
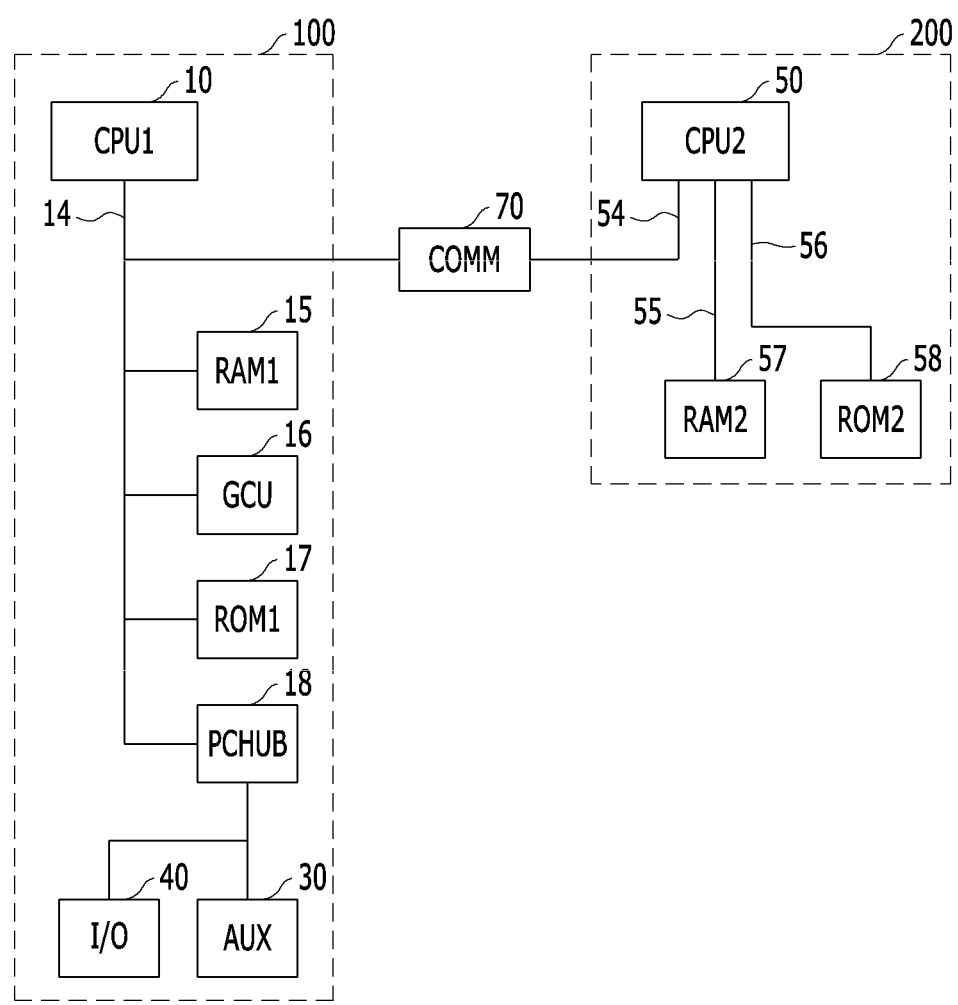
FIG. 4 is a structural diagram of a computer device according to another embodiment of the present invention.

In FIG. 4, the security management computing unit 100 is composed of a first central processing unit 10 having a multiple number of dedicated hardware interfaces 14, each of which is designed independently in consideration of the characteristics of the connected device; a first random access memory (RAM) 15, a graphic controller unit 16, a first boot ROM 17, a peripheral device controller hub unit 18, and an intercommunication unit 70 connected independently to the first central processing unit 10 by using the dedicated interfaces 14; and an auxiliary storage device unit 30 and an input/output device unit 40 connected to the peripheral device controller hub unit 18.

The user computing unit 200 includes a second central processing unit 50 that is connected with the intercommunication unit 70 by way of a first dedicated interface 54, connected with a second random access memory 57 by way of a second dedicated interface 55, and connected with a second boot ROM 58 by way of a third dedicated interface 56.

Here also, the auxiliary storage device unit 30 is physically or logically separated into a security management computing storage area 31, which is the part used by the security management computing unit 100, and a user computing storage area 32, which is used by the user computing unit 200, as shown in FIG. 2. The security management computing storage area 31 is characterized by not being exposed to the user computing unit 200. The user OS data installed on the user computing unit 200 is stored in the user computing storage area 32 of the auxiliary storage device unit 30, with a duplicated version of user OS data stored in the security management computing storage area 31 of the auxiliary storage device unit 30, and is transferred from the security management computing unit 100 via the intercommunication unit 70 to the user computing unit 200 to be installed and executed in the second random access memory unit.

Using the frequently used Intel chipset as an example, the CPU is connected to the DRAM via DDR3, and the graphics unit is connected by a high-speed PCI interface and is connected by DMI (desktop management interface) with PCH (platform controller hub) for overseeing and controlling peripheral devices. Auxiliary storage device units such as HDD, ODD, etc., are connected to the PCH by way of a SATA or ESATA, etc., and a keyboard, mouse, and external devices are connected by way of USB interfaces. The booting BIOS is connected by way of the PCH, or in some cases, by way of a low-speed communication interface known as LPC (low profile connection).

Here, DDR3 interface, PCI interface, DMI, etc. correspond to the dedicated interfaces of the present invention. As the intercommunication unit 70 of the present invention has to communicate at high speeds, it can be preferable that the intercommunication unit 70 be connected to a high-speed PCI interface directly connected to the CPU. From the foregoing, the present invention that relates to a computer that can respond to attempts at seizing the system with malicious code and minimize damage to the system has been explained. A computer according to the present invention has the user programs and the user OS running on separate isolated hardware, making it possible to monitor and prevent occurrences of arbitrary changes made by malicious code on the OS or the content of a program or user file stored on an auxiliary storage device such as a hard disk.

Also, with a computer according to the present invention, even if malicious code were executed, it would be isolated in the user computing unit, so that problems caused by malicious code in existing computers can be monitored and restored by the security management computing unit. To this end, the security management computing unit is formed to disallow installations or changes to programs as a rule, and in order to install or change a program, one has to use a separate type of access. Thus, the security management computing unit is able to respond immediately when there is a malfunction at the user computing unit, and in today's environment where security problems become increasingly important, this would provide beneficial albeit with a somewhat increase in cost.

From the perspective of access time, since the auxiliary storage device unit and the I/O devices are managed by the security management computing unit, the time expended in accessing these devices may be increased from the point of view of the user computing unit. However, since the access times of the devices connected to the USB, HDD, or ODD themselves are tens to hundreds of times slower than the access time of the RAM where the program is running, the increase in access time would not provide an adverse effect on the overall performance of the system. Also, as having the security management computing unit run parts of the user programs or user OS would allow increased processing speed at the user computing unit, the overall reduction in speed would be negligible. Moreover, the losses incurred by an undesired leak of information resulting from a compromise in security would greatly surpass the cost of the computer, and as such, the computer based on the present invention can be regarded as having sufficiently high viability.

Furthermore, a computer according to the present invention provides great advantages in security, as it allows limiting the running of user programs according to the program type or time, etc., and allows recording or reporting any information that is outputted to the outside (via a printer, an external storage device, a communication network, etc.) during the running of a program.

A few illustrative embodiments are described above with reference to the drawings. However, the technical scope and the scope of rights of the present invention are not limited to the embodiments described above. The technical scope and the scope of rights of the present invention are to be defined by a reasonable interpretation of the scope of claims set forth below.

The invention claimed is:
1. A computer comprising:
a security management computing unit comprising: a first central processing unit (CPU) having a first address bus, a first data bus, and a first control bus; a first memory unit connected to the first central processing unit by way of the first address bus, the first data bus, and the first control bus; an auxiliary storage device unit connected to the first central processing unit by way of the first address bus, the first data bus, and the first control bus; and an input/output (I/O) device unit connected to the first central processing unit by way of the first address bus, the first data bus, and the first control bus;

a user computing unit comprising: a second central processing unit (CPU) having a second address bus, a second data bus, and a second control bus; and a second memory unit connected to the second central processing unit by way of the second address bus, the second data bus, and the second control bus; and an intercommunication unit connected to the first central processing unit of the security management computing unit by way of the first address bus, the first data bus, and the first control bus and connected to the second central processing unit of the user computing unit by way of the second address bus, the second data bus, and the second control bus, for communication with the first central processing unit and the second central processing unit, wherein the security management computing unit performs I/O device management, system monitoring and restoration, and a monitoring and control of the user computing unit, wherein the user computing unit executes a user program and a user operating system (OS) while isolated from the security management computing unit, wherein the auxiliary storage device unit in the security management computing unit includes a security management computing storage area and a user computing storage area, the security management computing storage area directly connected to the security management computing unit only and unexposed to the user computing unit, the user computing storage area used by the user computing unit, an original version of the user OS executed on the user computing unit is stored in the user computing storage area, and a duplicated version of the user OS is stored in the security management computing storage area, and wherein the security management computing unit selectively provides the duplicated version of the user OS stored in the security management computing storage area during a booting of the user computing unit.

2. The computer according to claim 1, wherein the intercommunication unit comprises an interrupt register connected to the first central processing unit by way of a first address bus, a first data bus, and a first control bus and connected to the second central processing unit by way of a second address bus, a second data bus, and a second control bus.

3. The computer according to claim 1, wherein the security management computing unit, upon receiving a request from the user computing unit to change a file system of the user computing storage area of the auxiliary storage device unit, stores restoration information of an existing file system in the security management computing storage area of the auxiliary storage device unit.

4. The computer according to claim 1, wherein a software program that is run on the computer includes a first software module that is executed on the security management computing unit and a second software module that is executed on the user computing unit.

5. A computer comprising:

a security management computing unit comprising: a first central processing unit having a plurality of dedicated hardware interfaces; a first random access memory (RAM), a graphic controller unit, a first boot read-only memory (ROM), a peripheral device controller hub unit, and an intercommunication unit connected independently to the first central processing unit by using dedicated interfaces; and an input/output (I/O) device unit and an auxiliary storage device unit connected to the peripheral device controller hub unit, and a user computing unit comprising a second central processing unit, the second central processing unit connected with the intercommunication unit by way of a first dedicated interface, connected with a second random access memory by way of a second dedicated interface, and connected with a second boot read-only memory (ROM) by way of a third dedicated interface, wherein the security management computing unit performs input/output (I/O) device management, system monitoring and restoration, and a monitoring and control of the user computing unit, wherein the user computing unit executes a user program and a user operating system (OS) while isolated from the security management computing unit, wherein the auxiliary storage device unit in the security management computing unit includes a security management computing storage area and a user computing storage area, the security management computing storage area directly connected to the security management computing unit only and unexposed to the user computing unit, the user computing storage area used by the user computing unit, and an original version of the user OS executed on the user computing unit is stored in the user computing storage area and a duplicated version of the user OS is stored in the security management computing storage area, and wherein the security management computing unit selectively provides the duplicated version of the user OS stored in the security management computing storage area during a booting of the user computing unit.

6. The computer according to claim 5, wherein the intercommunication unit comprises an interrupt register connected to the first central processing unit by way of a first address bus, a first data bus, and a first control bus and connected to the second central processing unit by way of a second address bus, a second data bus, and a second control bus.

7. The computer according to claim 5, wherein the security management computing unit, upon receiving a request from the user computing unit to change a file system of the user computing storage area of the auxiliary storage device unit, stores restoration information of an existing file system in the security management computing storage area of the auxiliary storage device unit.

8. The computer according to claim 5, wherein a software program that is run on the computer includes a first software module that is executed on the security management computing unit and a second software module that is executed on the user computing unit.

9. A computer comprising:

a security management computing unit configured to manage an auxiliary storage device unit and an input/output (I/O) device connected thereto; and a user computing unit configured to communicate with the I/O device via an intercommunication unit for enabling communication between the security management computing unit and the user computing unit, the user computing unit having a separate central processing unit (CPU) and memory and connected to the security management computing unit, wherein the security management computing unit performs I/O device management, system monitoring and restoration, and a monitoring and control of the user computing unit, wherein the user computing unit executes a user program and a user operating system (OS) while isolated from the security management computing unit, wherein the auxiliary storage device unit in the security management computing unit includes a security management computing storage area and a user computing storage area, the security management computing storage area directly connected to the security management computing unit only and unexposed to the user computing unit, the user computing storage area used by the user computing unit, and an original version of the user OS executed on the user computing unit is stored in the user computing storage area and a duplicated version of the user OS is stored in the security management computing storage area, and wherein the security management computing unit selectively provides the duplicated version of the user OS stored in the security management computing storage area during a booting of the user computing unit.

10. The computer according to claim 9, further comprising a mouse unit and a keyboard unit coupled to the I/O device, wherein the user computing unit performs information input/output with the keyboard unit and the mouse unit via the intercommunication unit under a control of the security management computing unit.

11. The computer according to claim 9, further comprising a video display unit, the video display unit comprising: a first video memory connected to the security management computing unit; a second video memory connected to the security management computing unit and the user computing unit; and a video graphic controller connected to the security management computing unit and configured to selectively display information from the first video memory and the second video memory on a monitor display screen.

12. The computer according to claim 11, wherein an OS operated on the security management computing unit further includes a means for controlling the video display unit to selectively display content from the first video memory or content from the second video memory according to a hardware input by a user.

13. The computer according to claim 9, wherein the security management computing unit, upon receiving a request from the user computing unit to change a file system of the user computing storage area of the auxiliary storage device unit, stores restoration information of an existing file system in the security management computing storage area of the auxiliary storage device unit.

14. The computer according to claim 9, wherein a software program that is run on the computer includes a first software module that is executed on the security management computing unit and a second software module that is executed on the user computing unit.

* * * * *